(12) United States Patent
Spangenberg et al.

(10) Patent No.: US 6,772,872 B2
(45) Date of Patent: Aug. 10, 2004

(54) APPARATUS FOR DIVERTING SUCCESSIVE ARTICLES IN A SINGLE LANE TO PLURAL LANES

(75) Inventors: Thomas Spangenberg, Baltimore, MD (US); Carl Rakowski, Jr., Owings Mills, MD (US)

(73) Assignee: AMBEC, Inc., Owings Mills, MD (US)

( * ) Notice: Subject to any disclaimer, the term of this patent is extended or adjusted under 35 U.S.C. 154(b) by 0 days.

(21) Appl. No.: 10/701,365

(22) Filed: Nov. 3, 2003

(65) Prior Publication Data

US 2004/0129533 A1 Jul. 8, 2004

Related U.S. Application Data

(60) Provisional application No. 60/423,149, filed on Nov. 2, 2002.

(51) Int. Cl.$^7$ .............................................. B65G 47/26
(52) U.S. Cl. ........................................ 198/442; 198/427
(58) Field of Search .................................. 198/427, 442

(56) References Cited

U.S. PATENT DOCUMENTS

| | | | |
|---|---|---|---|
| 3,193,078 A | 7/1965 | Amenta et al. | |
| 3,599,789 A | 8/1971 | Kurczak | |
| 3,822,006 A | 7/1974 | Shuttleworth | |
| 3,830,359 A | 8/1974 | Fogelberg | |
| 4,060,165 A | 11/1977 | Bauer | |
| 4,147,248 A | 4/1979 | Kurczak et al. | |
| 4,265,356 A | 5/1981 | Glover | |
| 4,296,590 A | 10/1981 | Focke | |
| 4,498,575 A | 2/1985 | Arfert et al. | |
| 4,723,649 A | 2/1988 | Hartness et al. | |
| 4,779,715 A | 10/1988 | Pazdernik | |
| 4,830,173 A | 5/1989 | Hartness et al. | |
| 4,842,124 A * | 6/1989 | Musschoot .................. | 198/360 |
| 4,880,103 A * | 11/1989 | Ludwig et al. ............. | 198/434 |
| 4,974,721 A | 12/1990 | Born | |
| 5,107,978 A | 4/1992 | Andrew | |
| 5,174,430 A | 12/1992 | Ebira | |
| 5,333,722 A | 8/1994 | Ouellette | |
| 5,388,682 A * | 2/1995 | Dudley ....................... | 198/367 |
| 5,423,409 A * | 6/1995 | Wipf .......................... | 198/367 |
| 5,441,142 A | 8/1995 | Schneider | |
| 5,567,091 A | 10/1996 | Johnson et al. | |
| 5,761,883 A * | 6/1998 | Pruett et al. ................. | 53/448 |
| 5,787,679 A | 8/1998 | Lynch et al. | |
| 5,788,052 A * | 8/1998 | Spatafora .................... | 198/442 |
| 5,944,165 A | 8/1999 | Mannlein et al. | |
| 5,979,635 A | 11/1999 | Calhoun | |
| 6,220,427 B1 * | 4/2001 | Ratz et al. ................ | 198/861.2 |
| 6,666,324 B2 * | 12/2003 | Engarto et al. ............. | 198/447 |

OTHER PUBLICATIONS

Penn Packaging Ltd web site (http://www.penn-packaging-.com), Penn Packaging Conveyor System; Applicant became aware of product in or about Mar., 2003.

* cited by examiner

*Primary Examiner*—Douglas Hess
(74) *Attorney, Agent, or Firm*—Benesch, Friedlander, Coplan & Aronoff LLP

(57) ABSTRACT

An apparatus and method for diverting articles from a single lane to one of a plurality of lanes wherein the articles in the single lane are moving on a conveyor along a travel path, the apparatus comprising a pair of spaced apart flexible rails suspended above the conveyor where the flexible rails define a guide channel therebetween. The guide channel can have an upstream portion configured to receive the articles in the single lane and a downstream portion configured to distribute the articles to one of the lanes. The flexible rails are movable in a direction substantially parallel to the travel path. The downstream portion of the guide channel is configured to be selectively movable in a direction substantially perpendicular to the travel path in order to selectively distribute the articles to one of the lanes.

20 Claims, 7 Drawing Sheets

APPARATUS FOR DIVERTING SUCCESSIVE ARTICLES IN A SINGLE LANE TO PLURAL LANES

CROSS-REFERENCE TO RELATED APPLICATION

This application claims the benefit of priority to U.S. Provisional Application No. 60/423,149 filed on Nov. 2, 2002, which is hereby incorporated by reference in its entirety.

BACKGROUND

In the packaging of articles, it is often necessary to take a single lane of successive articles and divert it into two or more lanes for packaging. The division process is used in container filling and packaging lines, for example, to supply containers to packaging machines that have a plurality of infeed lanes. For example, articles for production lines, such as containers being filled with a product, come from the filling equipment with sealing means applied to them in a single lane on a conveyor and have to be divided into a plurality of lanes in order to be filled into packages such as three-packs or six-packs. This division of a main stream article line transported on a conveyor into a plurality of lanes can also be necessary when it is desired to separate articles of similar cross-section shape, by height, or by color, or during an inspection process where it would be necessary to reject the articles for flaws or missing components such as caps or labels.

One existing apparatus for dividing a single lane of articles into multiple lanes employs an upstream lane, two downstream lanes, and a mechanism to change the angle of the upstream lane in a region proximate the two downstream lanes so as to permit a movable end of the upstream lane to be positioned to feed into either of the two downstream lanes. Such arrangements, unfortunately, do not permit conveyance of the articles as quickly as desired without unduly increasing the risk of a blockage due to failure of the article to make the turn in the transition between the upstream single lane and the two or more downstream lanes.

Another existing apparatus employs a servo motor to move a single pair of swing arms to divide a lane of articles into multiple lanes. The swing arms move one complete width of the lane when it is desired to change lanes. While the swing arms are moved from one lane to another lane, the articles are slowed down or stopped to retard movement of the articles through the swing arms.

BRIEF DESCRIPTION OF THE DRAWINGS

It will be appreciated that the illustrated boundaries of elements (e.g., boxes or groups of boxes) in the figures represent one example of the boundaries. One of ordinary skill in the art will appreciate that one element may be designed as multiple elements or that multiple elements may be designed as one element. An element shown as an internal component of another element may be implemented as an external component and vice versa.

Further, in the accompanying drawings and description that follow, like parts are indicated throughout the drawings and description with the same reference numerals, respectively. The figures are not drawn to scale and the proportions of certain parts have been exaggerated for convenience of illustration.

DETAILED DESCRIPTION OF ILLUSTRATED EMBODIMENTS

Figure 1:
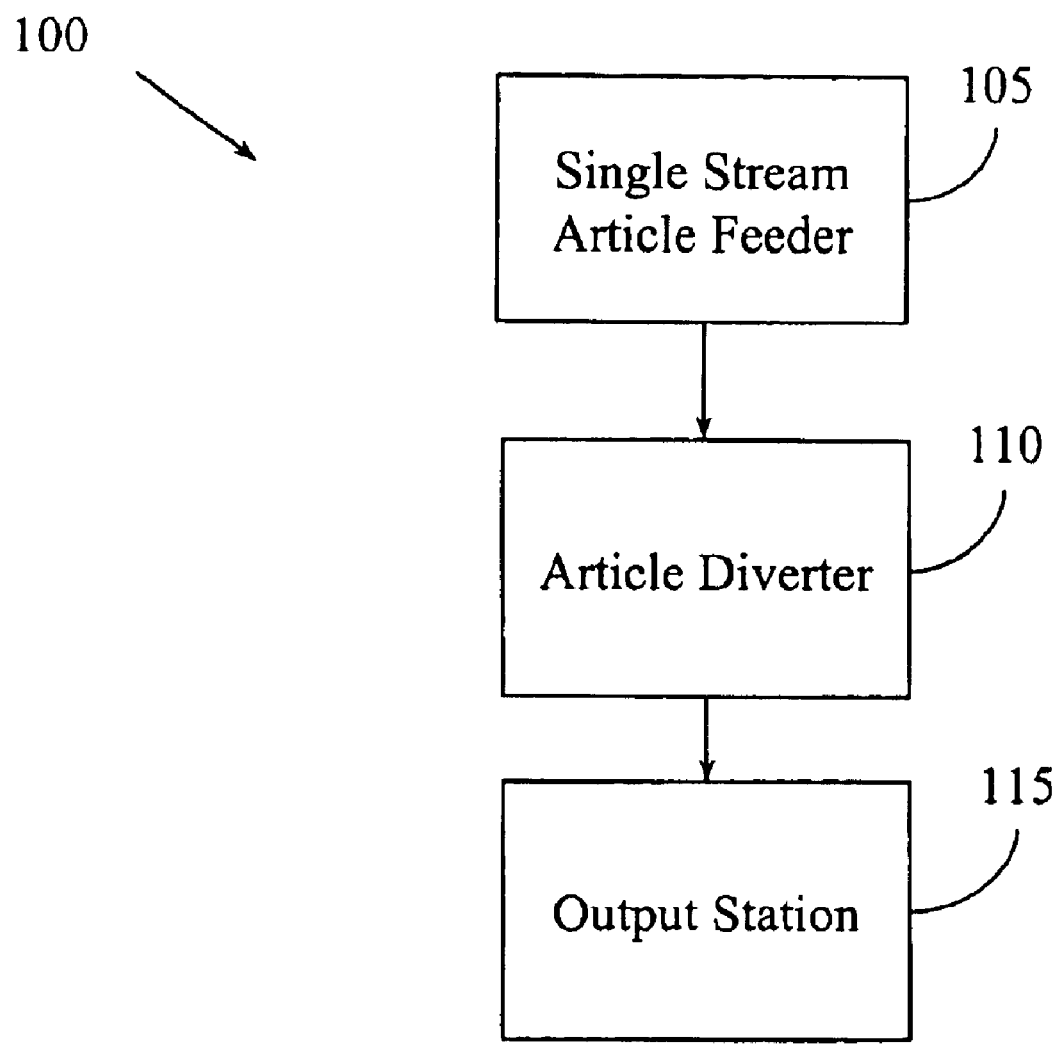
FIG. 1 is a diagram of one embodiment of a conveyor system 100.

Illustrated in FIG. 1 is one embodiment of a conveyor system 100. The conveyor system 100 may be used to fill, label, and/or package bottles, container, etc. In one embodiment, the conveyor system 100 may include an article handling mechanism such as an article feeder 105. The article feeder 105 can be configured to supply articles in a single file lane along a travel path to an apparatus 110 for diverting a single lane of successive articles into plural lanes. As discussed herein, the term "lane" may also be referred to as a stream, row, or column.

The articles divided in separate lanes can then be advanced to an output station 115. In one embodiment, the output station 115 can include an article packager for packaging the articles. For example, the articles may be packaged as 2-packs, 4-packs, 6-packs, etc. In another embodiment, the output station 115 can include multiple labeling devices for applying labels to the articles. For example, the output station 115 can include multiple labeling devices for applying the same labels to each stream of articles. On the other hand, the output station 115 can include multiple labeling devices for applying different labels to each stream of articles. Optionally, the output station 115 can include both the labeling devices and the packager provided in series. It will be appreciated that the output station 115 could include other components including a multiple article packager, palletizer, reject station, quality control checking station, or any combination thereof.

Figure 2:
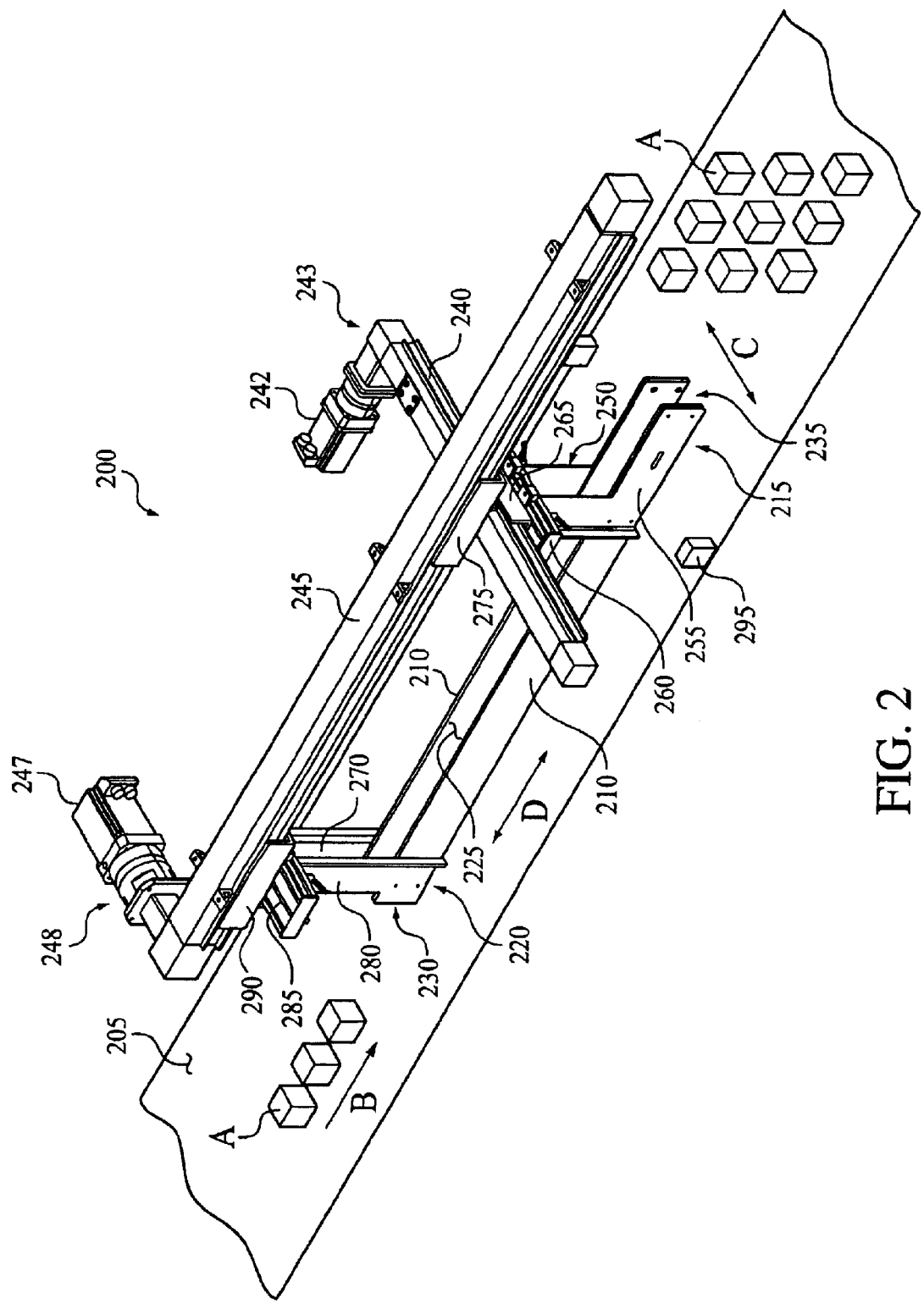
FIG. 2 illustrates one embodiment of an apparatus 200 for diverting a single lane of successive articles into plural lanes.

Illustrated in FIG. 2 is a perspective view of one embodiment of an apparatus 200 for diverting a single lane of successive articles into plural lanes. In one embodiment, the apparatus 200 can be provided above an article carrier 205 that engages and moves articles A along a travel path, represented by arrow B, in a single lane. In one embodiment, the article carrier can include, for example, an endless belt or chain conveyor. It will be appreciated that other types of article carriers may be used instead of an endless belt or chain conveyor such as an air conveyor or roller conveyor.

The apparatus 200 can include a pair of spaced apart rails 210 that extend in a direction substantially parallel to the travel path B. In one embodiment, the rails 210 can be flexible. However, it will be appreciated that the rails can be rigid and kept straight. As discussed herein, the term "flexible rail" may also be referred to as a guide rail or a fence.

Each flexible rail 210 has a downstream portion 215 and an upstream portion 220. The flexible rails 210 can be constructed from a variety of materials such as metal, plastic, or other composite material.

In one embodiment, the flexible rails 210 can be oriented substantially parallel to each other and define a flexible guide channel 225 therebetween. The flexible rails 210 and the flexible guide channel 225 may also be collectively referred to as a flexible guide chute. In one embodiment, the guide channel 225 can be configured to assist in the process of guiding and directing the articles A from the single lane into plural lanes. By directing the articles A into plural lanes, the articles A in each lane can be labeled and/or packaged appropriately.

In one embodiment, the guide channel 225 can include an upstream portion 230 configured to receive the articles A in the single lane and a downstream portion 235 configured to distribute the articles A into one of the plurality of lanes. The width W of the guide channel 225 can be dimensioned a distance sufficient to permit passage of articles A therebetween.

To move and configure the flexible rails 210 to guide and direct the articles A from the single lane into plural lanes, the apparatus 200 may further include drive means coupled to the flexible rails 210. In one embodiment, the drive means include one or more positioning devices such as a linear drive mechanisms. For example, the linear drive mechanisms can include a first linear actuator 240 and a second linear actuator 245.

The first linear actuator 240 can be configured to move the downstream portion 215 of the flexible rails 210 in a linear direction, represented by arrows C, substantially perpendicular to the direction of the travel path B. On the other hand, the second linear actuator 245 can be configured to move the flexible rails 210 in a linear direction, represented by arrows D, substantially parallel to the direction of the travel path B. The second linear actuator 245 can, for example, be configured to be moveable in a linear direction substantially parallel to the direction of the travel path B between a retracted position or home position (which is the furthest upstream position) and an extended position (which is the furthest downstream position). Of course, the length of travel is dependent on the length of the linear actuator utilized.

One suitable example of a linear actuator is the ERV Series Value Series Rodless Linear Actuator manufactured by Parker Hannifin Corporation, Wadsworth, Ohio, which is an electromechanical belt driven linear actuator. Obviously, other types of electromechanical linear actuators may be used such as leadscrew assemblies, rack and pinion assemblies, and linear servomotors. However, it will be appreciated that other types of linear actuators can be used such as slides that are powered hydraulically, pneumatically, or electromagnetically. In another embodiment, the drive means may include other types of positioning devices that can be powered pneumatically, hydraulically, or electromechanically, or electromagnetically.

In one embodiment, a motor 242 and a planetary gear system 243 can independently drive the first linear actuator 240, and a motor 247 and a planetary gear system 248 can independently drive the second linear actuator 245. The motors 242, 247 can be, for example, bi-directional servomotors. However, it will be appreciated that other types of motors can be used such as AC motors, DC motors, and stepper motors.

In one embodiment, the first linear actuator 240 can be coupled to the downstream portion 215 of the flexible rails 210 via coupling mechanism 250. In this manner, movement of the first linear actuator 240 forces the downstream portion 215 of the flexible rails 210 (and the downstream portion 235 of the guide channel 225) to move in the same direction, while the upstream portion 230 of the flexible rails 210 remains fixed in the direction perpendicular to the travel path B. In one embodiment, the coupling mechanism 250 can include a rail support 255 secured to a mounting block 260 and a mounting plate 265 secured to the mounting block 260 and the first linear actuator 240. Obviously, it will be appreciated that the coupling mechanism 250 can include more or less components depending on the size, shape, and orientation of the components.

In one embodiment, the second linear actuator 245 can be coupled to the flexible rails 210 at two locations. First, the second linear actuator 245 can be coupled to the upstream portion 220 of the flexible rails 210 via coupling mechanism 270. Second, the second linear actuator 245 can be coupled to the first linear actuator 240 via a mounting bracket 275 at the downstream portion 215 of the flexible rails 210. In this manner, movement of the second linear actuator 245 in one of the directions D forces the flexible rails 210 (and the guide channel 225) to move in the same direction. Also, it will be appreciated that since the second linear actuator 245 carries the first linear actuator 240, the second linear actuator 245 moves the first linear actuator in one of the directions D. Although the figures illustrate that the second linear actuator 245 can be coupled to the flexible rails 210 at two locations, it will be appreciated that the second linear actuator 245 can be coupled to the flexible rails 210 at any desired number of locations.

In one embodiment, the coupling mechanism 270 can include a rail support 280 secured to a mounting block 285 and a mounting plate 290 secured to the mounting block 285 and the second linear actuator 245. Obviously, it will be appreciated that the coupling mechanism 270 can include more or less components depending on the size, shape, and orientation of the components.

In one embodiment, the first and second linear actuators 240, 245, individually, act as conveyers that can move the upstream portion 215 of the flexible rails 210 (and the guide channel 225) in a direction transverse to the direction of the travel path B and can move the flexible rails 210 (and the guide channel 225) in a direction substantially parallel to the travel path B, respectively. However, in combination, the first and second linear actuators 240, 245 are configured to move and manipulate the flexible rails 210 into a variety of serpentine configurations to divert articles A into any selected one of the plurality of lanes. For example, to initiate a lane change (i.e., the diversion of articles A from one lane to another lane) when the flexible rails 210 are in the retracted position, the flexible rails 210 can be moved in a forward direction along the travel path B at a speed that is equal to the speed of article conveyance. Once the flexible rails 210 reach the speed of article conveyance, the downstream portion 215 of the flexible rails 210 can be moved in a direction substantially perpendicular to the travel path B, while the flexible rails 210 are moving along the travel path B, to configure the guide channel 225 into a serpentine or straight rail configuration. The serpentine or straight rail configuration of the guide channel 225 provides a path for the articles A to follow as they are directed to the selected lane.

In one embodiment, the initiation of a lane change can be activated by a signal generated by a sensor 295 positioned along the conveyor 205. For example, the sensor 295 can be positioned along the conveyor 205 upstream from the downstream portion 215 of the flexible rails 210 when in the retracted position. The sensor can be, for example, a photocell can be configured to count the articles A as they pass the sensor 295 along the conveyor 205. After a predetermined number of articles A have been distributed to a particular lane, the sensor 295 can detect the trailing edge of the last article A and send an electrical signal to a controller (not shown) to initiate a lane change. The controller (not shown) is configured to communicate and control the motors 242, 247 that are coupled to the first and second linear actuators 240, 245, respectively. The controller (not shown) can control the acceleration and speed of the flexible rails and can configure the flexible rails in any desired shape to direct the articles A into a selected lane. One example of a suitable controller is a programmable logic controller (PLC).

Figure 3:
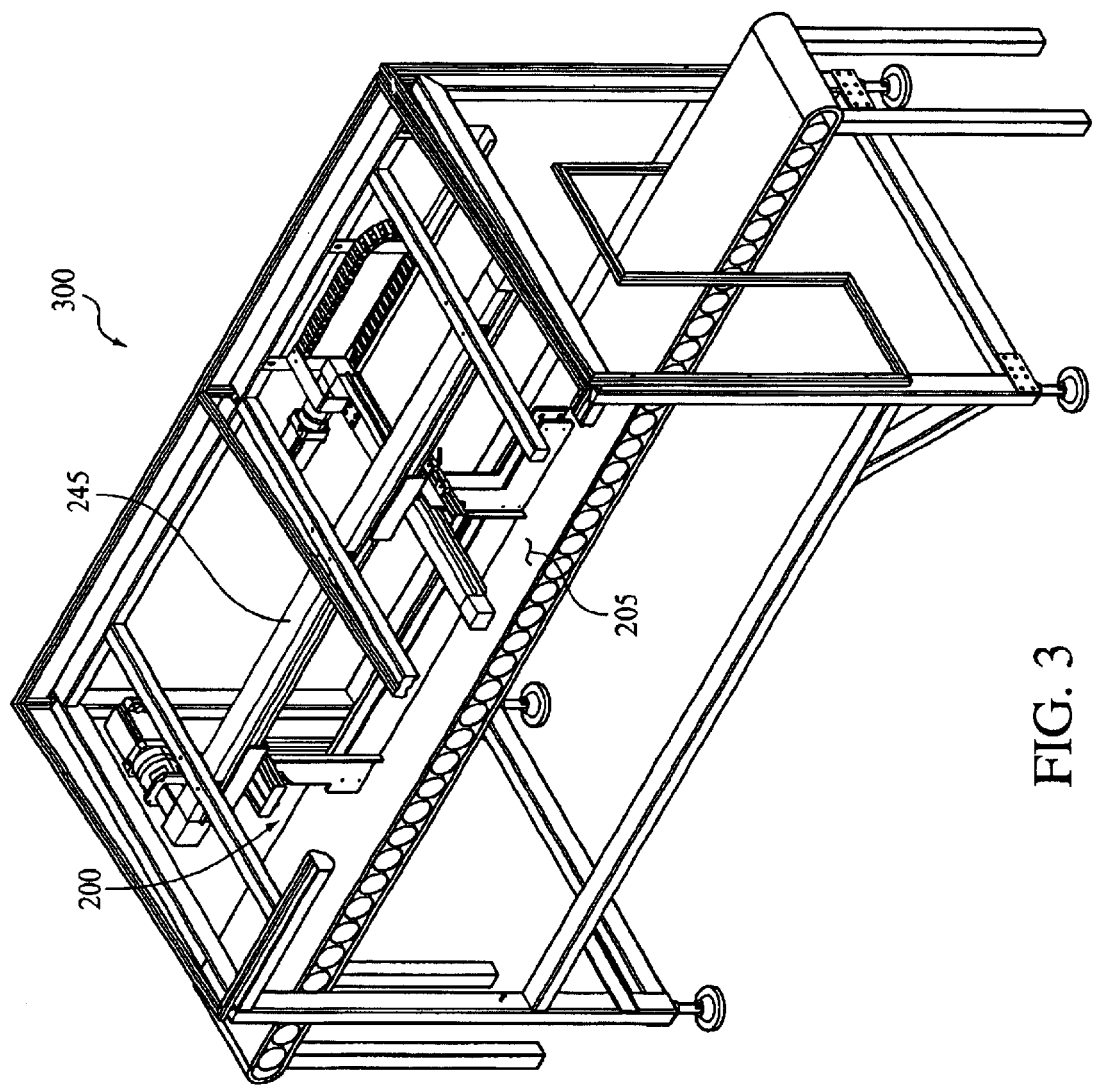
FIG. 3 illustrates one embodiment of the apparatus 200 attached to a frame system 300.

Illustrated in FIG. 3 is one embodiment of the apparatus 200 attached to a frame system 300. As previously discussed, the apparatus 200 is provided above the conveyor 205. In one embodiment, the apparatus 200 can be suspended above the conveyor 205. In this manner, the second linear actuator 245 can be mounted to the frame system 300 to suspend the apparatus 200 above the conveyor 205. The frame system 300 can also be used to act as a safety shield around the apparatus 200.

Figure 4:
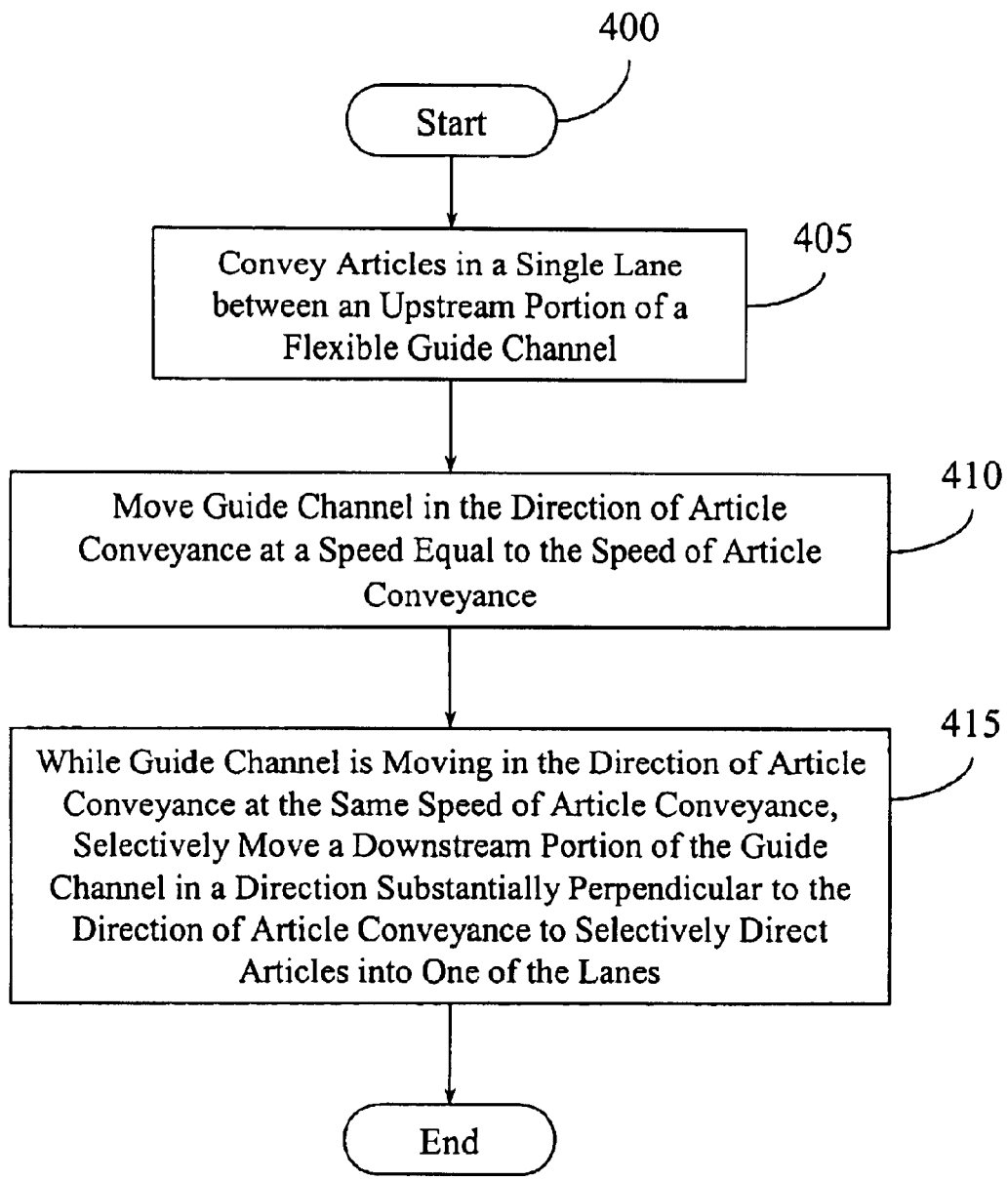
FIG. 4 illustrates one embodiment of a methodology associated with diverting successive articles from a single lane into plural lanes.

Illustrated in FIG. 4 is one embodiment of a methodology associated with diverting successive articles from a single lane into plural lanes. The illustrated elements denote "processing blocks" and represent functions and/or actions taken for diverting successive articles from a single lane into plural lanes. In one embodiment, the processing blocks may represent computer software instructions or groups of instructions that cause a computer or processor to perform an action(s) and/or to make decisions that control another device or machine to perform the processing. It will be appreciated that the methodology may involve dynamic and flexible processes such that the illustrated blocks can be performed in other sequences different than the one shown and/or blocks may be combined or, separated into multiple components. The foregoing applies to all methodologies described herein.

With reference to FIG. 4, the process 400 involves a process for diverting successive articles from a single lane into plural lanes. The process 400 includes conveying the articles in a single lane between an upstream portion of a guide channel defined between spaced apart flexible rails (block 405). To match the speed of the articles traveling on the conveyor, the guide channel can be moved in the direction of article conveyance at a speed equal to or greater than the speed of article conveyance (block 410).

While the guide channel is moving in the direction of article conveyance at the same speed of article conveyance, a downstream portion of the guide channel can be selectively moved in a direction substantially perpendicular to the direction of article conveyance to selectively distribute the articles into one of the lanes without reducing the speed of article conveyance (block 415). Accordingly, the net effect of moving the guide channel in the direction and at the same speed of article conveyance and moving the downstream portion of the guide channel in a direction substantially perpendicular to the direction of article conveyance causes the flexible rails (and the guide channel) to flex and form a serpentine configuration to direct the articles into a desired lane. Optionally, to prepare for another lane change, the flexible rails can be moved backward in a direction opposite the direction of article conveyance to its retracted position while in the same configuration.

Illustrated in FIGS. 5A–5F is a top view of one embodiment of a sequence of diverting successive articles from a single lane into plural lanes using the apparatus 200 illustrated in FIG. 2. It will be appreciated that FIGS. 5A–5F represent only one example of a diversion sequence and one skilled in the art would understand that there are many different sequences that may accomplish the diversion of successive articles from a single lane into plural lanes. The sequence steps may be repeated or may be re-ordered to divert articles in a different sequence. Each step in the sequence is numbered only for clarification purposes and is not intended to limit the sequence to only that which is illustrated in FIGS. 5A–5F. Further, although FIGS. 5A–5F depicts three lanes, it is apparent that the apparatus 200 can divert successive articles in a single lane into less than three lanes (e.g., two lanes) or more than three lanes (e.g., 12 lanes).

Figure 5A:
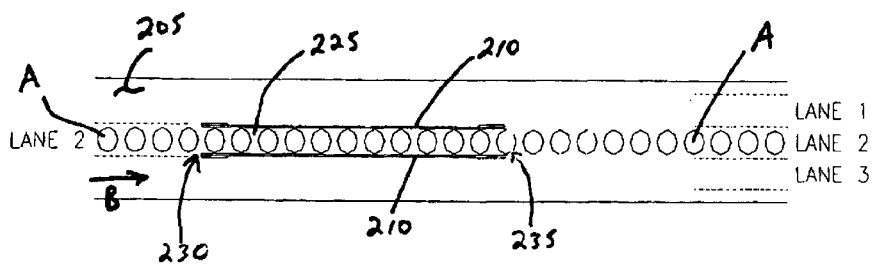
FIGS. 5A–5F illustrates a top view of one embodiment of a sequence of diverting successive articles from a single lane into plural lanes using the apparatus 200 illustrated in FIG. 2.

As shown in FIG. 5A, articles A are transported in succession on the conveyor 205 in a single lane (i.e., lane 2 in this example) along the travel path B. The articles A enter the upstream portion 230 of the guide channel 225 and exit through the downstream portion 235 of the guide channel 225 into lane 2 since the flexible rails 210 are in a straight configuration.

Figure 5B:
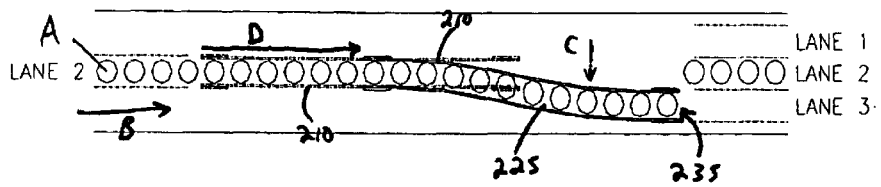

As shown in FIG. 5B, upon a signal to divert the articles A from lane 2 into lane 3, the flexible rails 210 (illustrated in phantom lines) are moved in unison in a direction, represented by arrow D, substantially parallel to the travel path B until they reach the same speed as the speed of article conveyance. Once the flexible rails 210 reach the speed of article conveyance, the downstream portions of the flexible rails 210 are moved in a direction substantially perpendicular to the travel path B, represented by arrow C, while the flexible rails 210 continue to move forward in the direction D. The net effect is that the flexible rails 210 are manipulated into a serpentine configuration (e.g., an inverted flat-S curve) where the downstream portion 235 of the guide channel 225 is aligned with lane 3 (illustrated in solid lines) and, thus, the articles A in lane 2 are diverted into lane 3. Articles A can continue to feed into lane 3 until the flexible rails 210 are moved to divert the articles A into a different lane. Optionally, if the rails 210 are not flexible, the rails 210 could be maintained in a straight configuration. The foregoing regarding the non-flexible rails applies to all rail configurations described herein.

Figure 5C:
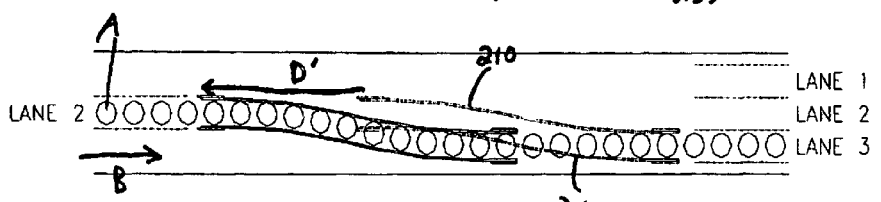

As shown in FIG. 5C, to begin the process of diverting articles A into a different lane (e.g., lane 2 or lane 1), the flexible rails 210 (illustrated in phantom lines) are retracted in a direction, represented by arrow D', opposite the direction of the travel path B while maintaining the same serpentine configuration (illustrated in solid lines). At this time, the articles A are still feeding lane 3.

Figure 5D:
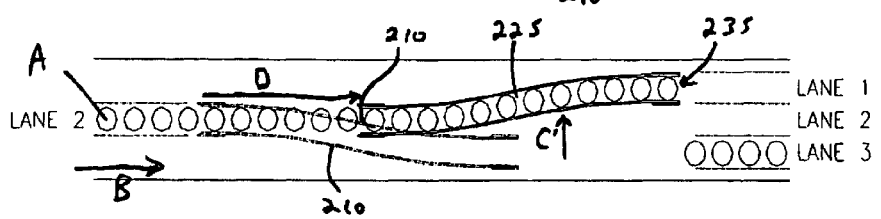

As shown in FIG. 5D, upon a signal to divert the articles A from lane 3 into lane 1, the flexible rails 210 (illustrated in phantom lines) are moved in unison in a direction, represented by arrow D, substantially parallel to the travel path B until they reach the same speed as the speed of article conveyance. Once the flexible rails 210 reach the speed of article conveyance, the downstream portions of the flexible rails 210 are moved in a direction substantially perpendicular to the travel path B, represented by arrow C', while the flexible rails 210 continue to move forward in the direction D. The net effect is that the flexible rails 210 are manipulated into a serpentine configuration (e.g., a flat-S curve) where the downstream portion 235 of the guide channel 225 is aligned with lane 1 (illustrated in solid lines) and, thus, the articles A in lane 2 are diverted into lane 1. Articles A can continue to feed into lane 1 until the flexible rails 210 are moved to divert the articles A into a different lane.

Figure 5E:
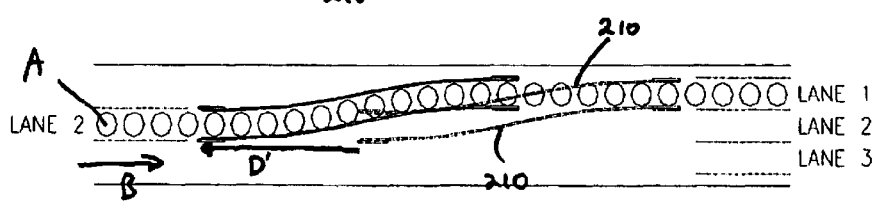

As shown in FIG. 5E, to begin the process of diverting articles A into a different lane (e.g., lane 2 or lane 3), the flexible rails 210 (illustrated in phantom lines) are retracted in a direction, represented by arrow D', opposite the direction of the travel path B while maintaining the same serpentine configuration (illustrated in solid lines). At this time, the articles A are still feeding lane 1.

Figure 5F:
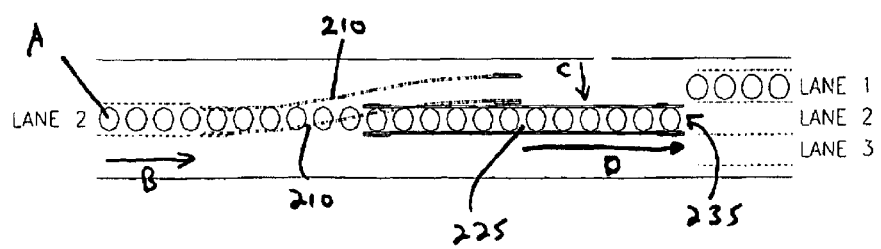

As shown in FIG. 5F, upon a signal to divert the articles A from lane 3 into lane 2, the flexible rails 210 (illustrated in phantom lines) are moved in unison in a direction, represented by arrow D, substantially parallel to the travel path B until they reach the same speed as the speed of article conveyance. Once the flexible rails 210 reach the speed of article conveyance, the downstream portions of the flexible rails 210 are moved in a direction substantially perpendicular to the travel path B, represented by arrow C, while the flexible rails 210 continue to move forward in the direction D. The net effect is that the flexible rails 210 are manipulated into back into a straight rail configuration where the downstream portion 235 of the guide channel 225 is aligned with lane 2 (illustrated in solid lines) and, thus, the articles A in lane 2 are maintained in lane 2. Articles A can continue to feed into lane 2 until the flexible rails 210 are moved to divert the articles A into a different lane.

In general, articles A traveling in succession in a single lane can be diverted into any one of plural lanes according to the position of the flexible rails 210 as described above and depicted in FIGS. 5A–5F. After a predetermined number of articles have been distributed in a particular lane, the sensor senses the trailing edge of the last article initiate a lane change. Immediately after the sensor senses the trailing edge of the last article, the flexible rails 210 are moved in the direction substantially parallel to the travel path B until they reach the same speed as the speed of article conveyance. While the flexible rails 210 are moving in the same direction as the travel path B, the downstream portions of the flexible rails 210 can be selectively moved in a direction substantially perpendicular to the travel path B to configure the flexible rails 210 to divert articles A into a selected lane. Once the flexible rails 210 are in position and diverting articles A, the flexible rails 210 can retract in a direction opposite the travel path B to position itself for the diversion of articles A into a different lane.

In one embodiment, the apparatus 200 can divert successive articles from a single lane into any one of plural lanes in a continuous fashion without any stopping and/or pausing of the articles along the conveyor. For example, the apparatus 200 can divert successive articles from a single lane into any one of plural lanes in a continuous fashion without changes in conveyor speed.

Figure 6:
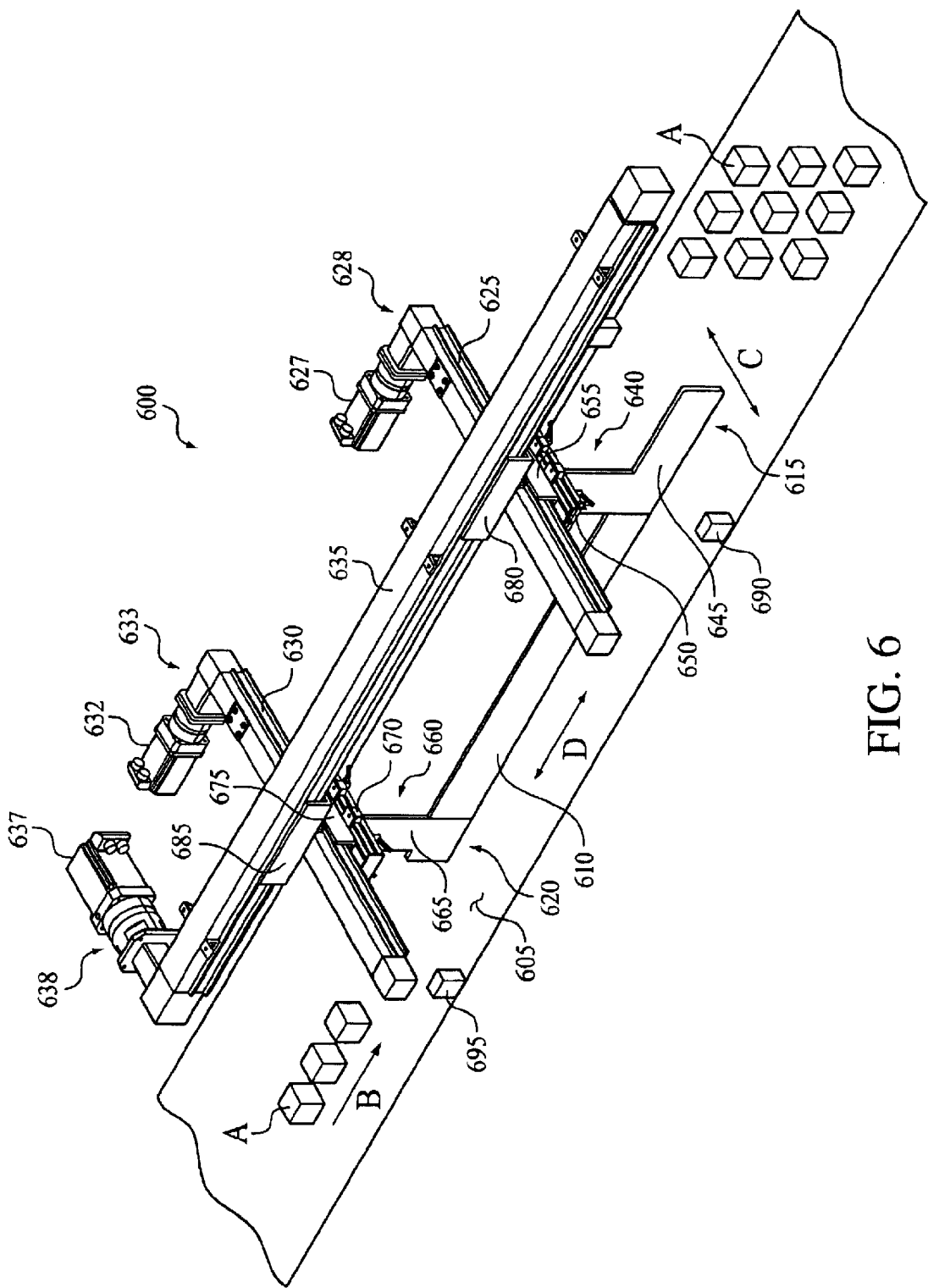
FIG. 6 illustrates another embodiment of an apparatus 600 for diverting a single lane of successive articles into plural lanes.

Illustrated in FIG. 6 is another embodiment of an apparatus 600 for diverting successive articles from a single lane into plural lanes. In one embodiment, the apparatus 600 can be provided above an article carrier 605 that engages and moves articles A along a travel path, represented by arrow B, in a single lane. The apparatus 600 is similar in structure to the apparatus 200 described above and illustrated in FIG. 2, except that the apparatus 600 includes only one rail 610 having a downstream portion 615 and an upstream portion 620. In one embodiment, the rail 610 can be flexible. However, it will be appreciated that the rails can be rigid and straight.

To move and manipulate the flexible rail 610 to guide and direct the articles A from the single lane into plural lanes, the apparatus 600 may further include drive means coupled to the flexible rail 605. In one embodiment, the drive means include one or more positioning devices such as a linear drive mechanisms. For example, the linear drive mechanisms can include a first linear actuator 625, a second linear actuator 630, and a third linear actuator 635. The first linear actuator 625 can be configured to move the downstream portion 615 of the flexible rail 610 in a linear direction, represented by arrows C, substantially perpendicular to the direction of the travel path B. The second linear actuator 630 can be configured to move the upstream portion 620 of the flexible rail 610 in a linear direction, represented by arrows C, substantially perpendicular to the direction of the travel path B. On the other hand, the third linear actuator 635 can be configured to move the flexible rail 610 in a linear direction, represented by arrows D, substantially parallel to the direction of the travel path B. The third linear actuator 635 can, for example, be configured to be moveable in a linear direction substantially parallel to the direction of the travel path B between a retracted position (which is the furthest upstream position) and an extended position (which is the furthest downstream position). Of course, the length of travel is dependent on the length of the linear actuator utilized.

In one embodiment, the first linear actuator 625 can be independently driven by a motor 627 and a planetary gear system 628, the second linear actuator 630 can be independently driven by a motor 632 and a planetary gear system 633, and the third linear actuator 635 can be independently driven by a motor 637 and a planetary gear system 638. The motors 627, 632, 637 can be, for example, bi-directional servomotors. However, it will be appreciated that other types of motors can be used such as AC motors, DC motors, or stepper motors.

In one embodiment, the first linear actuator 625 can be coupled to the downstream portion 615 of the flexible rail 610 via coupling mechanism 640. In this manner, movement of the first linear actuator 625 forces the downstream portion 615 of the flexible rail 610 to move in the same direction. In one embodiment, the coupling mechanism 640 can include a rail support 645 secured to a mounting block 650 and a mounting plate 655 secured to the mounting block 650 and the first linear actuator 625. Obviously, it will be appreciated that the coupling mechanism 640 can include more or less components depending on the size, shape, and orientation of the components.

In one embodiment, the second linear actuator 630 can be coupled to the upstream portion 620 of the flexible rail 610 via coupling mechanism 660. In this manner, movement of the second linear actuator 625 forces the upstream portion 615 of the flexible rail 610 to move in the same direction. In one embodiment, the coupling mechanism 660 can include a rail support 665 secured to a mounting block 670 and a mounting plate 675 secured to the mounting block 670 and the second linear actuator 630. Obviously, it will be appreciated that the coupling mechanism 660 can include more or less components depending on the size, shape, and orientation of the components.

In one embodiment, the third linear actuator 635 can be coupled to the flexible rail 610 at two locations. First, the third linear actuator 635 can be coupled to the first linear actuator 625 via a mounting bracket 680 at the downstream portion 615 of the flexible rail 610. Second, the third linear actuator 635 can be coupled to the second linear actuator 630 via a mounting bracket 685 at the upstream portion 620 of the flexible rail 610. In this manner, movement of the third linear actuator 635 in a direction substantially parallel to the travel path B forces the flexible rail 610 and the first and second linear actuators 625, 630 to move in the same direction. Although the figures illustrate that the third linear actuator 635 can be coupled to the flexible rail 610 at two locations, it will be appreciated that the third linear actuator 635 can be coupled to the flexible rail 610 at any desired number of locations.

Individually, the first linear actuator 625 acts as a conveyor that can move the downstream portion 615 of the flexible rail 610 in a direction substantially perpendicular to the direction of the travel path B, the second linear actuator 630 acts as a conveyor that can move the upstream portion 620 of the flexible rail 610 in a direction substantially perpendicular to the direction of the travel path B, and the third linear actuator 635 acts as a conveyor that can move the flexible rail 610 in a direction substantially parallel to the travel path B. However, in combination, the first, second, and third linear actuators 625, 630, 635 are configured to move and manipulate the flexible rail 610 into a variety of serpentine configurations to divert successive articles A from a single lane into plural lanes.

In one embodiment, the initiation of a lane change (i.e., the diversion of articles A from one lane to another lane) can be activated by a signal generated by a sensor 690 positioned along the conveyor 605. For example, the sensor 690 can be positioned along the conveyor 605 upstream from the downstream portion 615 of the flexible rail 610 when in the retracted position. The sensor can be, for example, a photocell configured to count the articles A as they pass the sensor 690 along the conveyor 605. In another embodiment, another sensor 695 can be positioned upstream of the rail 610 to track the leading edge of the articles A to assist in initiating a lane change.

After a predetermined number of articles A have been distributed to a particular lane, the sensor 690 can detect the trailing edge of the last article A and send an electrical signal to a controller (not shown) to initiate a lane change. The controller (not shown) is configured to communicate and control the motors 627, 632, 637 that are coupled to the first, second, and third linear actuators 625, 630, 635, respectively. The controller (not shown) can control the acceleration and speed of the flexible rail 610 and can configure the flexible rail 610 in any desired shape to direct the articles A into a selected lane.

Illustrated in FIGS. 7A–7J is a top view of one embodiment of a sequence of diverting successive articles from a single lane into plural lanes using the apparatus 600 illustrated in FIG. 6. It will be appreciated that FIGS. 7A–7J represent only one example of a diversion sequence and one skilled in the art would understand that there are many different sequences that may accomplish the diversion of successive articles from a single lane into plural lanes. The sequence steps may be repeated or may be re-ordered to divert articles in a different sequence. Each step in the sequence is numbered only for clarification purposes and is not intended to limit the sequence to only that which is illustrated in FIGS. 7A–7J. Further, although FIGS. 7A–7J depicts three lanes, it is apparent that the apparatus 600 can divert successive articles in a single lane into less than three lanes (e.g., two lanes) or more than three lanes (e.g., 12 lanes).

Figure 7A:
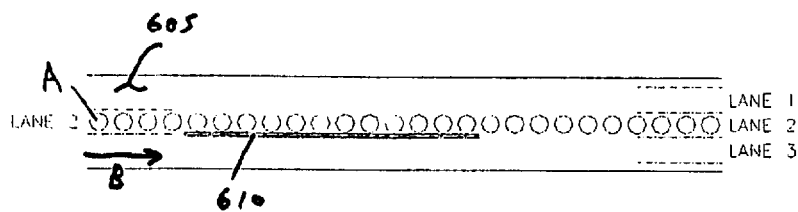
FIGS. 7A–7J illustrates a top view of one embodiment of a sequence of diverting successive articles from a single lane into plural lanes using the apparatus 600 illustrated in FIG. 6.

As shown in FIG. 7A, articles A are transported in succession on the conveyor 605 in a single lane (i.e., lane 2 in this example) along the travel path B. The articles A continue feeding into lane 2 since the flexible rail 610 is in a straight configuration thereby allowing the articles A to pass by the flexible rail 610, which is positioned to the right of the articles A in lane 2 in its retracted position, without being diverted. For purposes of simplicity and establishing a reference direction in the drawings, the direction "right" is the direction with respect to the articles A moving along the travel path B.

Figure 7B:
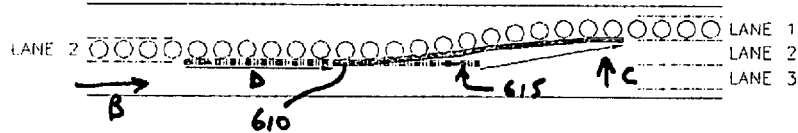

As shown in FIG. 7B, upon a signal to divert the articles A from lane 2 into lane 1, the flexible rail 610 (illustrated in phantom lines) is moved in a direction, represented by arrow D, substantially parallel to the travel path B until it reaches the same speed as the speed of article conveyance. Once the flexible rail 610 reaches the speed of article conveyance, the downstream portion 615 of the flexible rail 610 is moved in a direction substantially perpendicular to the travel path B, represented by arrow C, while the flexible rail 610 continues to move forward in the direction D. The net effect is that the flexible rail 610 is manipulated into a serpentine configuration (e.g., a flat-S curve) where the articles A in lane 2 are diverted into lane 1. Articles A can continue to feed into lane 1 until the flexible rail 610 is moved to divert the articles A into a different lane. Optionally, if the rail 610 is not flexible, the rail 610 could be maintained in a straight configuration. The foregoing regarding the non-flexible rail applies to all rail configurations described herein.

Figure 7C:
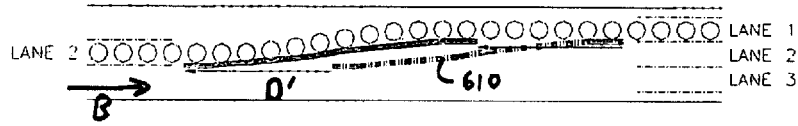

As shown in FIG. 7C, to begin the process of diverting articles A into a different lane (e.g., lane 2), the flexible rail 610 (illustrated in phantom lines) is moved in a direction, represented by arrow D', opposite the direction of the travel path B back to its retracted position while maintaining the same serpentine configuration (illustrated in solid lines). At this time, the articles A are still feeding lane 1.

Figure 7D:
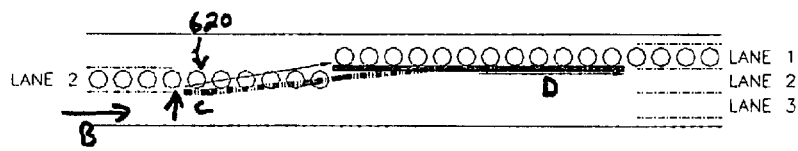

As shown in FIG. 7D, upon a signal to divert the articles A from lane 1 into lane 2, the flexible rail 610 (illustrated in phantom lines) is moved in the same direction as the travel path B until it reaches the same speed as the speed of article conveyance. Once the flexible rail 610 reaches the speed of article conveyance, the upstream portion 620 of the flexible rail 610 is moved in a direction substantially perpendicular to the travel path B, represented by arrow C, while the flexible rail 610 continues to move forward in the direction D. The net effect is that the flexible rail 610 is manipulated into a straight rail configuration (illustrated in solid lines) allowing the articles A to pass by the flexible rail 610, which is positioned now to the left of the articles A, into lane 2 without being diverted. Articles A can continue to feed into lane 2 until the flexible rail 610 is moved to divert the articles A into a different lane.

Figure 7E:
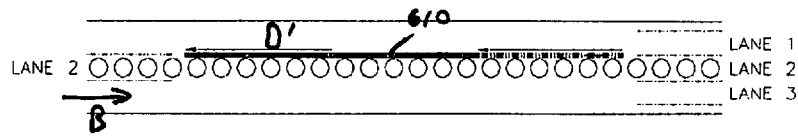

As shown in FIG. 7E, to begin the process of diverting articles A into a different lane (e.g., lane 3), the flexible rail 610 (illustrated in phantom lines) is moved in a direction, represented by arrow D', opposite the direction of the travel path B back to its retracted position while maintaining the same straight rail configuration (illustrated in solid lines). At this time, the articles A are still feeding lane 2.

Figure 7F:
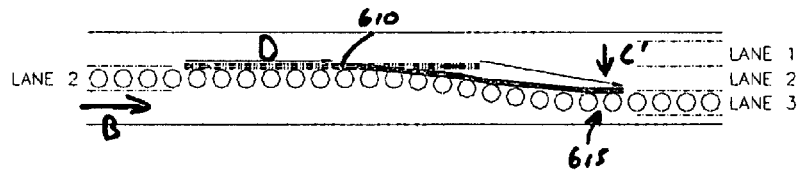

As shown in FIG. 7F, upon a signal to divert the articles A from lane 2 into lane 3, the flexible rail 610 (illustrated in phantom lines) is moved in the same direction as the travel path B until it reaches the same speed as the speed of article conveyance. Once the flexible rail 610 reaches the speed of article conveyance, the downstream portion 615 of the flexible rail 610 is moved in a direction substantially perpendicular to the travel path B, represented by arrow C', while the flexible rail 610 continues to move forward in the direction D. The net effect is that the flexible rail 610 is manipulated into a serpentine configuration (e.g., an inverted flat-S curve) where the articles A in lane 2 are diverted into lane 3. Articles A can continue to feed into lane 3 until the flexible rail 610 is moved to divert the articles A into a different lane.

Figure 7G:
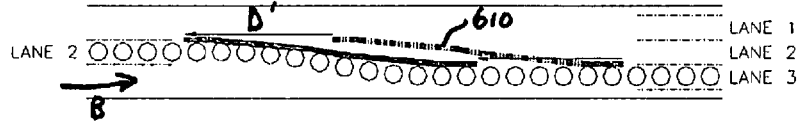

As shown in FIG. 7G, to begin the process of diverting articles A into a different lane (e.g., lane 2), the flexible rail 610 (illustrated in phantom lines) is moved in a direction, represented by arrow D', opposite the direction of the travel path B back to its retracted position while maintaining the same serpentine configuration (illustrated in solid lines). At this time, the articles A are still feeding lane 3.

Figure 7H:
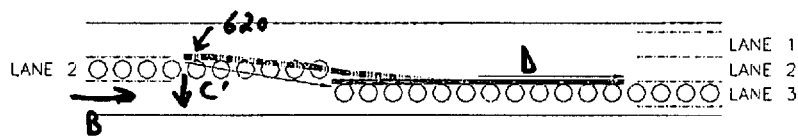

As shown in FIG. 7H, upon a signal to divert the articles A from lane 3 into lane 2, the flexible rail 610 (illustrated in phantom lines) is moved in the same direction as the travel path B until it reaches the same speed as the speed of article conveyance. Once the flexible rail 610 reaches the speed of article conveyance, the upstream portion 620 of the flexible rail 610 is moved in a direction substantially perpendicular to the travel path B, represented by arrow C', while the flexible rail 610 continues to move forward in the direction D. The net effect is that the flexible rail 610 is manipulated into a straight rail configuration (illustrated in solid lines) allowing the articles A to pass by the flexible rail 610, which is positioned now to the right of the articles A, into lane 2 without being diverted. Articles A can continue to feed into lane 2 until the flexible rail 610 is moved to divert the articles A into a different lane.

Figure 7I:
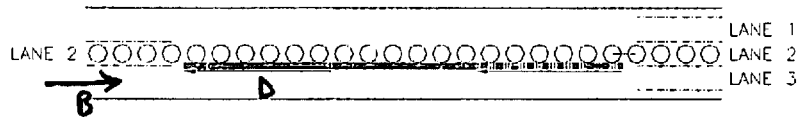

As shown in FIG. 7I, to begin the process of diverting articles A into a different lane (e.g., lane 2), the flexible rail 610 (illustrated in phantom lines) is moved in a direction, represented by arrow D', opposite the direction of the travel path B back to its retracted position while maintaining the same straight rail configuration (illustrated in solid lines). At this time, the articles A are still feeding lane 2.

Figure 7J:
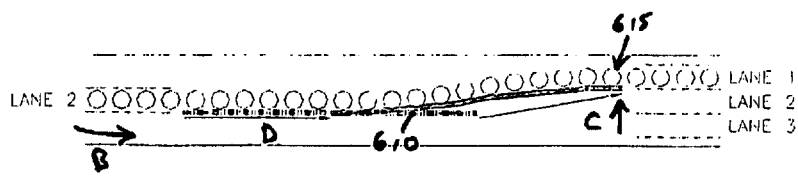

As shown in FIG. 7J, upon a signal to divert the articles A from lane 2 into lane 1, the flexible rail 610 (illustrated in phantom lines) is moved in a direction, represented by arrow D, substantially parallel to the travel path B until it reaches the same speed as the speed of article conveyance. Once the flexible rail 610 reaches the speed of article conveyance, the downstream portion 615 of the flexible rail 610 is moved in a direction substantially perpendicular to the travel path B, represented by arrow C, while the flexible rail 610 continues to move forward in the direction D. The net effect is that the flexible rail 610 is manipulated into a serpentine configuration (e.g., a flat-S curve, illustrated in solid lines) where the articles A in lane 2 are diverted into lane 1. Articles A can continue to feed into lane 1 until the flexible rail 610 is moved to divert the articles A into a different lane.

In general, articles A traveling in succession in a single lane can be diverted into any an adjacent lane depending on the position of the flexible rail 610 as described above and depicted in FIGS. 7A–7J. After a predetermined number of articles have been distributed in a particular lane, the sensor senses the trailing edge of the last article to initiate a lane change. Immediately after the sensor senses the trailing edge of the last article, the flexible rail 610 is moved in the direction substantially parallel to the travel path B until it reaches the same speed as the speed of article conveyance. While the flexible rail 610 is moving in the same direction as the travel path B, the downstream portion 615 of the flexible rails 210 can be selectively moved in a direction substantially perpendicular to the travel path B to configure the flexible rail 610 to divert the articles A into an adjacent lane. Once the flexible rail 610 is in position and diverting articles A, the flexible rails 210 can retract in a direction opposite the travel path B to position itself for the diversion of articles A into a different lane.

In one embodiment, the apparatus 600 can divert successive articles from a single lane into plural lanes in a continuous fashion without any stopping and/or pausing of the articles along the conveyor. For example, the apparatus 600 can divert successive articles from a single lane into plural lanes in a continuous fashion without changes in conveyor speed.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. An apparatus for diverting articles in single file to a plurality of lanes wherein the articles in the single lane are moving on a conveyor along a travel path, the apparatus comprising:
   a flexible rail provided above the conveyor, the flexible rail having an upstream portion and a downstream portion,
   wherein the flexible rail is configured to be movable in a direction substantially parallel to the travel path,
   wherein, while the flexible rail is moving in the direction substantially parallel to the travel path, the downstream portion of the flexible rail is configured to be selectively movable in a direction substantially perpendicular to the travel path in order to selectively direct the articles to one of the lanes.

2. The apparatus of claim 1 wherein the flexible rail is configured to move in the direction substantially parallel to the travel path at a speed substantially equal to the speed of article conveyance.

3. The apparatus of claim 1 further comprising drive means coupled to the flexible rail to selectively move the flexible rail in a configuration that guides the articles into one of the lanes.

4. The apparatus of claim 3 wherein the drive means includes:
   a first linear actuator coupled to the downstream portion of the flexible rail and configured to move the flexible rail in a linear direction substantially perpendicular to the direction of the travel path,
   a second linear actuator coupled to the upstream portion of the flexible rail and configured to move the flexible rail in a linear direction substantially perpendicular to the direction of the travel path, and
   a third linear actuator coupled to the first and second linear actuators and configured to move the flexible rail in a linear direction substantially parallel to the direction of the travel path.

5. The apparatus of claim 1 further comprising another flexible rail spaced apart from the flexible rail defining a guide channel therebetween.

6. The apparatus of claim 5 wherein the guide channel includes an upstream portion configured to receive the articles in the single lane and a downstream portion configured to distribute the articles to one of the lanes.

7. A system for directing articles in single file to a plurality of lanes, the system comprising:
   a conveyor configured to move the articles along a travel path, a guide rail provided above the conveyor, the guide rail having an upstream portion and a downstream portion, wherein the guide rail is configured to be movable in a direction substantially parallel to the travel path, wherein, while the guide rail is moving in the direction substantially parallel to the travel path at a speed substantially equal to the speed of article conveyance, the downstream portion of the guide rail is configured to be selectively movable in a direction substantially perpendicular to the travel path in order to selectively direct the articles to one of the lanes.

8. The system of claim 7 wherein at least a portion of the guide rail is flexible.

9. The system of claim 7 further comprising an article feeder to supply successive articles to the conveyor in a single lane.

10. The system of claim 7 further comprising a packager provided downstream from the guide rail to package the articles in separate lanes.

11. The system of claim 7 further comprising a sensor to initiate a lane change.

12. An apparatus for diverting articles from a single lane to one of a plurality of lanes wherein the articles in the single lane are moving on a conveyor along a travel path, the apparatus comprising:

a pair of spaced apart flexible rails suspended above the conveyor, the flexible rails defining a guide channel therebetween wherein the guide channel has an upstream portion configured to receive the articles in the single lane and a downstream portion configured to distribute the articles to one of the lanes, wherein the guide channel is configured to be movable in a direction substantially parallel to the travel path, wherein, while the guide channel is moving in the direction substantially parallel to the travel path, the downstream portion of the guide channel is configured to be selectively movable in a direction substantially perpendicular to the travel path, in order to selectively distribute the articles to one of the lanes.

13. The apparatus of claim 12 wherein the flexible rails are configured to move in the direction substantially parallel to the travel path at a speed substantially equal to the speed of article conveyance.

14. The apparatus of claim 12 further comprising drive means coupled to the flexible rails to selectively move the flexible rails such that the guide channel is configured to direct and guide the articles into one of the lanes.

15. The apparatus of claim 14 wherein the configuration of the guide channel is a serpentine-shaped curve.

16. The apparatus of claim 14 wherein the drive means includes:

a first linear actuator coupled to the downstream portion of the flexible rail and configured to move the flexible rails in a linear direction substantially perpendicular to the direction of the travel path, and a second linear actuator coupled to the first linear actuator and the upstream portion of the flexible rail, the second linear actuator configured to move the flexible rails in a linear direction substantially parallel to the direction of the travel path.

17. A method of diverting articles from a single lane to a plurality of lanes, the method comprising:

conveying the articles in a single lane between an upstream portion of a flexible guide chute, moving the flexible guide chute in the direction of article conveyance at a speed substantially equal to the speed of article conveyance; and while the flexible guide chute is moving in the direction of article conveyance, selectively moving a downstream portion of the flexible guide chute in a direction substantially perpendicular to the travel path to selectively distribute the articles into one of the lanes without reducing the speed of the articles moving on the conveyor.

18. The method of claim 17 further comprising the step of moving the flexible guide chute in a direction opposite the direction of article conveyance to a retracted position to prepare for an upcoming lane change.

19. The method of claim 17 further comprising the step of receiving a signal from a sensor positioned along the conveyor to initiate a lane change before the first moving step.

20. The method of claim 19 wherein the flexible guide chute is moved to the retracted position in a configuration substantially similar to a configuration of the flexible guide chute when in an extended position.

* * * * *